United States Patent [19]

Miki et al.

[11] Patent Number: 5,232,728
[45] Date of Patent: Aug. 3, 1993

[54] PROCESSED FOOD MADE OF IODINE-ENRICHED WHEAT FLOUR

[75] Inventors: Takashi Miki, Tokyo; Michio Fukatsu, Yokohama; Seiki Harada, Zushi, all of Japan

[73] Assignees: Nitto Chemical Industry Co., Ltd., Tokyo; Unicolloid, Inc., Kanagawa, both of Japan

[21] Appl. No.: 854,759

[22] Filed: Mar. 20, 1992

Related U.S. Application Data

[63] Continuation of Ser. No. 443,401, Nov. 30, 1989, abandoned.

[30] Foreign Application Priority Data

Apr. 27, 1989 [JP] Japan .................................. 1-108970

[51] Int. Cl.⁵ ...................... A21D 8/02; A23L 1/0532
[52] U.S. Cl. ...................................... 426/549; 426/74; 426/451; 426/556; 426/557; 426/575; 426/648

[58] Field of Search ................. 426/74, 549, 648, 556, 426/557, 451, 575

[56] References Cited

U.S. PATENT DOCUMENTS 4,113,892  9/1978  Shimizu et al. ...................... 426/602
4,230,735 10/1980  Yoshida et al. ...................... 426/113

*Primary Examiner*—Jeanette Hunter
*Assistant Examiner*—Mary S. Mims
*Attorney, Agent, or Firm*—Jordan and Hamburg

[57] ABSTRACT

Processed foods made of iodine-enriched wheat flour contain 0.05 mg to 40 mg of iodine per 100 g of wheat flour. The iodine is provided by blending small quantities of residues of extracts from sea weeds in the Laminaria group into wheat flour used for the production of such processed foods as bread, cakes, cookies, noodles, and the like. It is possible to intake essential iodine easily without any sense of incongruity.

7 Claims, No Drawings

PROCESSED FOOD MADE OF IODINE-ENRICHED WHEAT FLOUR

RELATED APPLICATION

This application is a continuation of application Ser. No. 443,401, filed Nov. 30, 1989, now abandoned.

BACKGROUND OF THE INVENTION

The present invention relates to processed foods made of iodine enriched wheat four. By eating those foods processed in accordance with this invention such as, for example, in the form of bread, cakes, cookies, noodles, or the like, diseases which may be caused as a result of an iodine shortage can be eliminated or prevented in those people whose iodine intake tends to be at a low level. By blending a small quantity of extracts from sea weeds, such as, for example, in the group of Laminaria, or the residue of such extracts, into wheat flour used for the production of such foods as stated above, it is possible to intake iodine easily without any sense of incongruity.

Furthermore, since the extracts or the residue of such extracts are natural food products, absolute safety is assured. Iodine is an element intensively existing within the thyroid gland of the human body and constitutes a component of thyroid hormones. A shortage of iodine may cause struma, hypothyroidism, or the like, with unfavorable symptoms such as, for example, slower reflection of the nervous system, obesity, sluggishness, fatigue, depression, or the like.

Among the foods consumed in the world, food produced from wheat flour such as, for example, bread, cakes, cookies, noodles, or the like are usually eaten in large quantities, regardless of racial and regional differences. However, the iodine content within wheat flour is only approximately 0.01 mg per 100 g. Accordingly, the iodine content of processed foods made from normal wheat flour is also low.

In general, sea weeds contain a high percentage of iodine. The iodine content of Laminaria Japonica is higher than that of other general sea weeds and may be up to 500 mg of iodine per 100 g of dried material. People living within coastal regions often have the opportunity to eat sea weeds. Accordingly, they can avoid unfavorable effects resulting from a shortage of iodine since iodine is routinely ingested into the body without the need for any supplemental intake. On the other hand, people living within regions remote from coastal regions do not have such opportunities to eat sea weeds. Accordingly, thyroid disfunction caused by iodine shortage may be observed.

SUMMARY OF THE INVENTION

An object of the present invention is to resolve the problem mentioned above by offering processed foods made of iodine-enriched wheat flour containing 0.05 mg to 40 mg of iodine (as I) within 100 g of wheat flour.

The processed foods made of such iodine-enriched wheat flour may be offered in the form of bread, cakes, cookies, biscuits, pies, noodles, or the like, and have minimized adversary effects with respect to the original taste and flavor of those processed foods. In addition, the essential mineral elements needed for the maintenance of human health such as, for example, zinc, chromium, selenium, iron, copper, molybdenum, manganese, lithium, nickel, cobalt, vanadium, tin, arsenic, and the like, can be ingested into the body in association with the iodine. The term "bread" as used herein means all kinds of bread such as, for example, plain bread, bean-jam buns, doughnuts, French rolls, buttered rolls, and the like.

DESCRIPTION OF THE PREFERRED EMBODIMENTS

Iodine enrichment by means of the addition of inorganic material such as, for example, potassium iodine is well known in the art. However, the present invention provides a method of enriching wheat flour by the addition of materials originating from non-toxic sea weeds, especially those materials originating from those sea weeds belonging to the group of Laminaria, so as to minimize the adversary effects of low iodine levels within the human body and any incongruity from the addition of iodine. Also, Laminaria Japonica and those sea weeds belonging to this group are preferable because of their high iodine content compared with other sea weeds.

The iodine content of processed foods made of wheat flour is normally expressed by means of its value in relation to the quantity of wheat flour. The iodine content expressed as I, within the processed foods formulated in accordance with the present invention, is within the range of 0.05 mg to 40 mg per 100 g of wheat flour, preferably 0.1 mg to 10 mg, and more preferably 0.4 mg to 1 mg. An iodine content of more than 40 mg is not preferable since such a high rate of iodine content may cause diseases due to an excess of iodine.

The sea weeds may be directly blended with the wheat flour as powder. However, the fabrication of such powder so a to have a similar particle size distribution is not easy. Accordingly, an extract using water, or alcohol as a solvent may be convenient. Also, extract residue using water, alcohol or carbon dioxide may be used.

In accordance with the foregoing, the features and advantages of the present invention will be described in the form of the following preferred examples. The term "sea weed" as used herein means all and any sea weeds which are regarded as being edible, including Laminaria Japonica and other sea weeds which are often used in cooking, and other sea weeds not regarded as food but which are used in cooking, as long as they are not toxic.

EXAMPLE 1

| | |
|---|---|
| Wheat flour (strong flour) | 500 g |
| Yeast | 125 g |
| Common Salt | 100 g |
| Sugar | 300 g |
| Margarine | 300 g |
| Bromide | 14 mg |
| Extract from Laminaria Japonica | 500 mg |
| Water | 3100 g |

Extract from Laminaria Japonica (iodine content: approx. 1 wt. %), produced by Nitto Chemical Industry Co., Ltd. using a hot water extraction method, was used. After 20 minutes of floor time, the bread dough completely matured and was divided and rounded into masses of 230 g each. The bread dough was frozen for storage. It could be sold in frozen form or used for making bread after thawing or defrosting.

EXAMPLE 2

| Wheat flour (strong flour) | 3,500 g |
|---|---|
| Yeast | 150 g |
| Bromide | 14 mg |
| Sugar | 250 g |
| Water | 2,000 g |

After mixing the above materials evenly, primary fermentation was performed for 150 minutes. Then, the following main materials were added and kneaded:

| Wheat flour (strong flour) | 1,500 g |
|---|---|
| Common Salt | 100 g |
| Margarine | 300 g |
| Extract from *Laminaria Japonica* | 500 mg |
| Water | 1,000 g |

Extract from Laminaria Japonica (iodine content: approx. 1%), produced by Nitto Chemical Industry Co., Ltd. using a hot water extraction method, was used. After 20 minutes of floor time, the bread dough completely matured and was divided and rounded into masses of 230 g each. After 15 minutes of bench time, it was fermented for 40 minutes in a dryer. Then, it was baked in an oven for 35 minutes at 220° C., and plain bread was obtained.

One pound (approximately 450 g) of the plain bread thus obtained contained 0.24 mg of iodine and, when slices into 6 pieces, each piece contained 0.04 mg (40 gamma) of iodine.

EXAMPLE 3

Three large eggs (total weight: 210 g) were divided into yolks and whites. The whites were shipped, 100 g of sugar was added, and meringue was obtained by further whipping. The yolks were added to the meringue, and this mixture was mixed evenly. Then, wheat flour was added and mixed rapidly. 20 g of milk, 30 mg of the same extract of Laminaria Japonica as was used in Example 1, and 15 g of butter were then added. The mixture was blended well and used as a sponge dough. In a circular baking mold (18 cm in diameter), paraffin paper was placed, and the above sponge dough was poured into it. This was placed upon a flat plate, put into an oven and baked for 30 minutes at 170° C. Then, whipped cream and strawberries were added to it so as to make a shortcake. By eating one portion (170 g) of this shortcake, 0.1 mg (100 γ) of iodine were ingested in quite a natural manner.

EXAMPLE 4

| Wheat flour | 1,000 g |
|---|---|
| Sugar | 450 g |
| Salad oil | 200 g |
| Sodium bicarbonate | 200 g |
| Calcium carbonate | 4 g |
| Common salt | 4 g |
| Extract of *Laminaria Japonica* (same as in Example 1) | 800 mg |
| Water | 180 g |

After placing the above materials into a mixer and mixing them for 10 minutes, the mixture was made into small pieces of 5 g each. Then, these pieces were placed into an oven heated to 190° C. at the inlet and 240° C. within the interior. By cooling them down naturally, soft biscuits were obtained. Special care was taken so that the temperature did not exceed 40° C. during mixing and kneading.

By eating one piece (approximately 5 g) of this biscuit, 0.02 mg (20 γ) of iodine were ingested in quite a natural manner.

EXAMPLE 5

| Wheat flour for macaroni (Durum wheat) | 1,000 g |
|---|---|
| Extract of *Laminaria Japonica* (same as in Example 1) | 130 mg |
| Water | 300 g |

After mixing and kneading the above materials for 10 minutes at 40° C., the materials were extruded from a pipe die having a diameter of 0.15 inches. After cooling the tubular product thus obtained, it was slowly dried in air, whereby the longer period of time produced macaroni.

200 g of macaroni thus obtained was placed into 2 liters of hot water with 30 g of common salt added thereto. After boiling the macaroni for 12 minutes, it was cooled in cold water.

Sliced onions, celery, cheese, sliced ham and lettuce were added to the boiled macaroni. Furthermore, 60 g of French dressing, 80 g of mayonnaise sauce and a small quantity of common salt and pepper were added to make macaroni salad.

By eating one portion (approximately 100 g) of this salad, 0.05 mg (50 γ) of iodine were ingested in quite a natural manner.

Obviously, many modifications and variations of the present invention are possible in light of the above teachings. It is therefore to be understood that within the scope of the appended claims, the present invention may be practiced otherwise than as specifically described herein.

What is claimed is:

1. A processed food comprising wheat flour and a residue of an extract of a non-toxic sea weed, said sea week extract residue being present in an amount sufficient to provide 0.05 to 40 mg of iodine in said processed food per 100 g of wheat flour.

2. A processed food according to claim 1, wherein said sea weed extract residue provides 0.1 to 10 mg of iodine per 100 g of wheat flour.

3. A processed food according to claim 1, wherein said sea weed extract residue provides 0.4 to 1 mg of iodine per 100 mg of wheat flour.

4. A processed food according to claim 1, wherein said non-toxic sea weed is a Laminaria group sea weed.

5. A processed food according to claim 1, wherein said non-toxic sea weed is Laminaria Japonica.

6. A processed food according to claim 1, selected from the group consisting of dough, bread, cake, cookie, biscuit, pie and noodle.

7. A processed food according to claim 1, wherein said sea weed extract residue comprises a residue of an extract of a non-toxic sea weed extracted with an extracting agent selected from the group consisting of water, alcohol and carbon dioxide.

* * * * *